United States Patent
Jarrett, Jr. et al.

(10) Patent No.: US 8,078,861 B1
(45) Date of Patent: Dec. 13, 2011

(54) REMOTE PROCESSOR REPROGRAMMING

(75) Inventors: Harold M. Jarrett, Jr., Jefferson, GA (US); Charles M. Miller, Jefferson, GA (US)

(73) Assignee: Omnimgtrix, LLC, Buford, GA (US)

( * ) Notice: Subject to any disclaimer, the term of this patent is extended or adjusted under 35 U.S.C. 154(b) by 768 days.

(21) Appl. No.: 12/069,816

(22) Filed: Feb. 13, 2008

(51) Int. Cl.
*G06F 9/00* (2006.01)
*G06F 15/177* (2006.01)
*G06F 3/00* (2006.01)
*G06F 13/00* (2006.01)
*G06F 11/00* (2006.01)
*G06F 9/44* (2006.01)
*G06F 9/445* (2006.01)
*H04B 1/38* (2006.01)
*H04B 1/02* (2006.01)
*H04B 1/06* (2006.01)

(52) U.S. Cl. ................ 713/2; 713/1; 713/100; 709/220; 710/8; 710/104; 714/746; 714/799; 717/171; 717/176; 455/73; 455/92; 455/352

(58) Field of Classification Search .................. 713/1, 2, 713/100; 709/220; 710/8, 104; 714/746, 714/799; 717/171, 176; 455/73, 92, 352
See application file for complete search history.

(56) References Cited

U.S. PATENT DOCUMENTS

| | | | | |
|---|---|---|---|---|
| 5,268,928 | A * | 12/1993 | Herh et al. | 375/222 |
| 6,560,703 | B1* | 5/2003 | Goodman | 713/2 |
| 7,093,244 | B2* | 8/2006 | Lajoie et al. | 717/168 |
| 7,246,266 | B2* | 7/2007 | Sneed et al. | 714/27 |
| 2004/0070281 | A1* | 4/2004 | Lineberger | 307/85 |
| 2005/0246703 | A1* | 11/2005 | Ahonen | 717/172 |
| 2006/0025875 | A1* | 2/2006 | Smith et al. | 700/86 |
| 2007/0185624 | A1* | 8/2007 | Duddles et al. | 701/1 |

* cited by examiner

*Primary Examiner* — Stefan Stoynov
(74) *Attorney, Agent, or Firm* — Kenneth W. Float

(57) ABSTRACT

Disclosed are exemplary remote programming systems, software and methods for use in remotely programming field devices, such as engines, power generators, controllers, and data sensors, and the like. A (wired or wireless) communications link interconnects a processor and a remotely located server. The processor comprises a program memory and firmware that is loaded into the program memory. The processor is coupled to a nonvolatile memory device and apparatus for communicating over the communications link. The remotely located server contains a source code file comprising updated firmware for the processor. Software or a method is provided that initiates a process wherein the updated firmware is transferred from the server to the processor and the updated firmware is stored in the nonvolatile memory. Once transfer is complete, a checksum is calculated for the transferred file, and if it matches a known checksum value, the updated firmware is transferred from the nonvolatile memory device into program memory and the processor is rebooted.

16 Claims, 2 Drawing Sheets

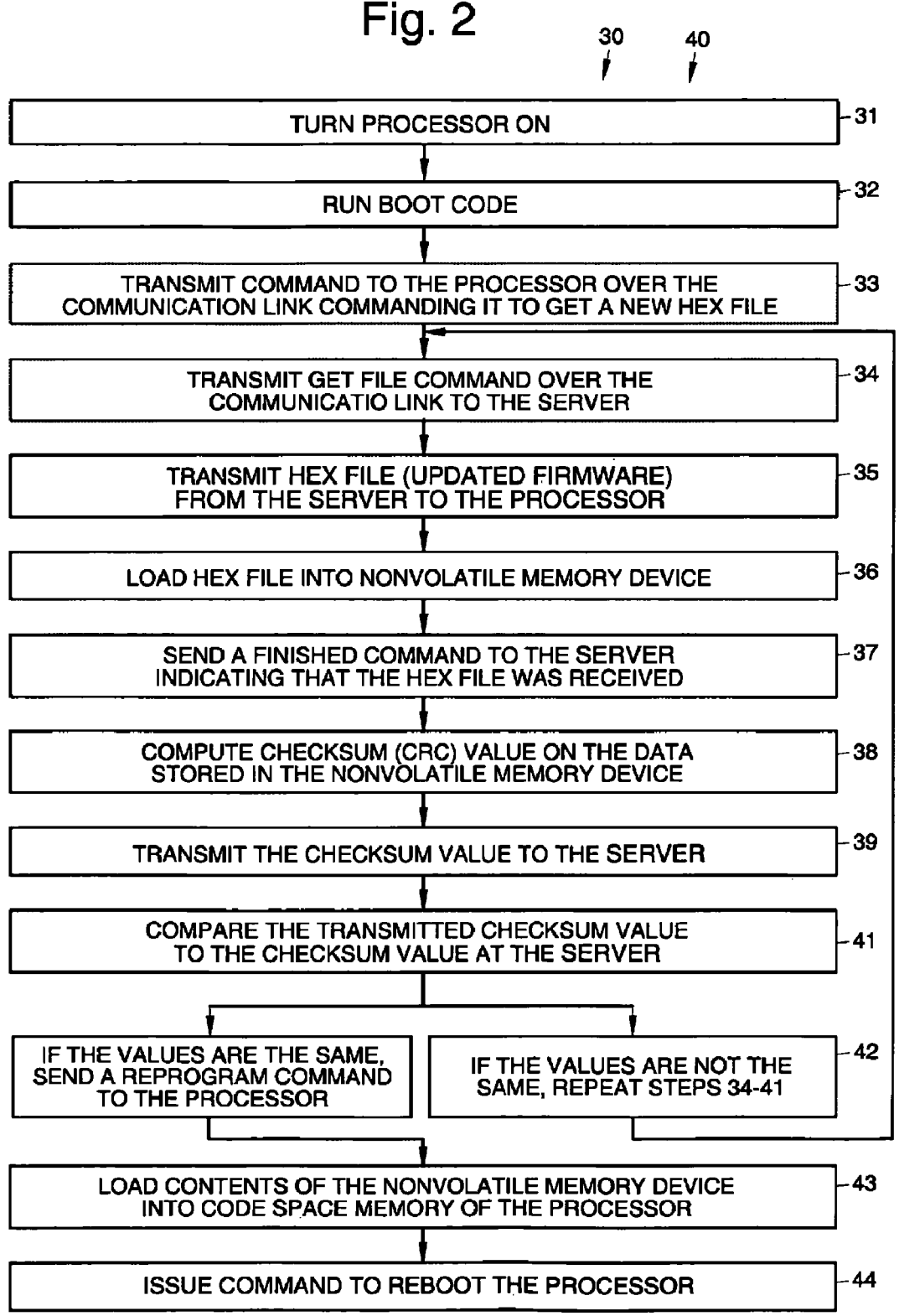

REMOTE PROCESSOR REPROGRAMMING

BACKGROUND

The present invention relates generally to remote reprogramming of field devices, including controllers, such as engine control systems, and remote monitoring and data sensors, and the like.

Heretofore, operating systems and software applications have been updated over the Internet, which may involve wireless communication over part of the communication system. For example, personal computer operating systems such as the Microsoft Windows operating system and the Macintosh operating system are updated via the world wide web. This may be done manually by the user or may be programmed into the operating system to automatically update the computer when an update is available. Software applications may be updated in a similar manner.

However engine control systems, such as are employed in standby power generators, and data sensing systems which may be used in remote monitoring applications, have not heretofore been remotely programmed or updated. It would be desirable to have remote programming systems, software and methods for remotely reprogramming processors used in remote monitoring systems and engine control systems, such as standby power generators, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a flow diagram illustrating exemplary remote programming methods and software.

DETAILED DESCRIPTION

Figure 1:
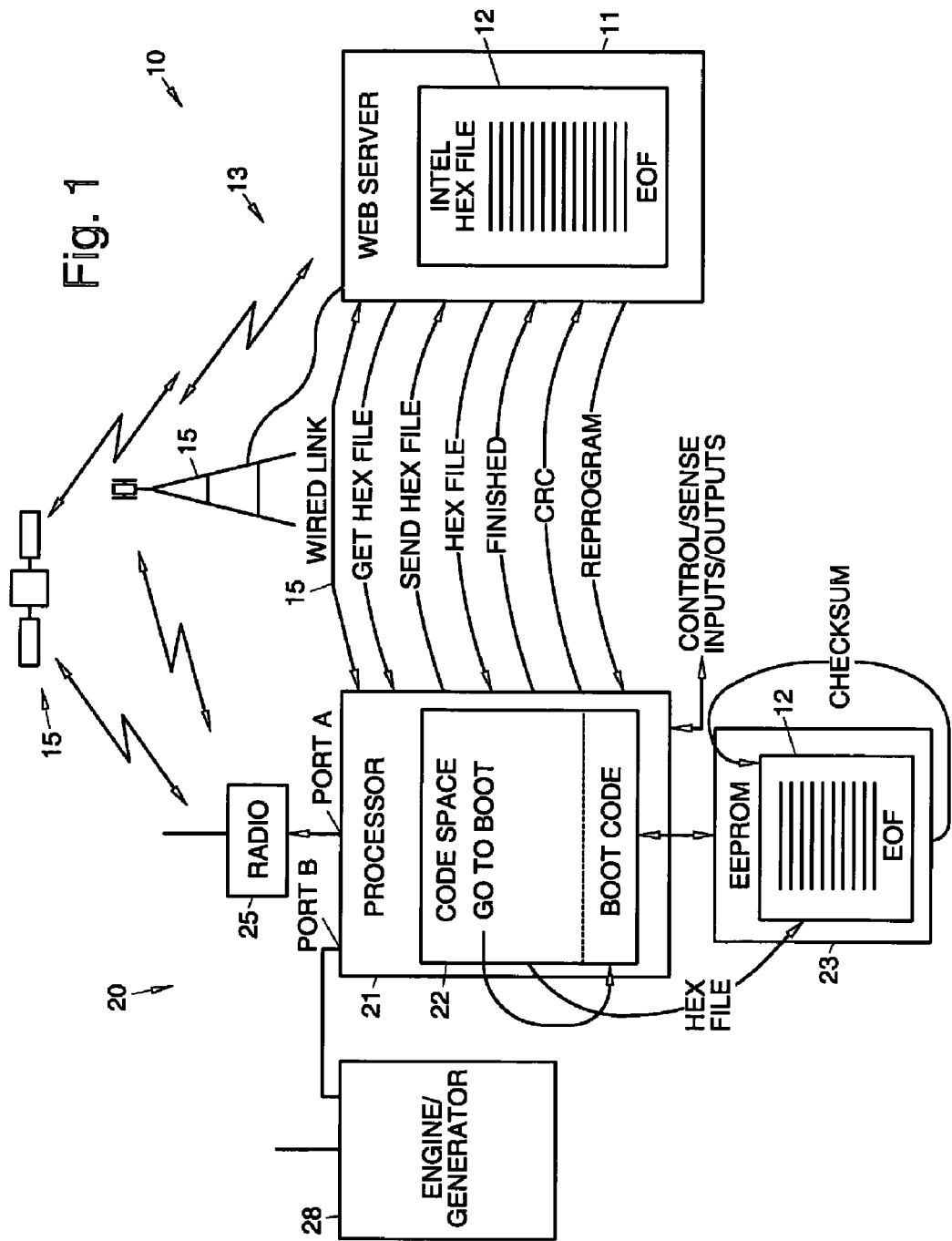
FIG. 1 illustrates exemplary remote programming systems.

Disclosed are remote reprogramming systems 10 (FIG. 1), along with software 40 and methods 30 (FIG. 2) that may be used to reprogram a remotely located (field) device 20. Exemplary remote reprogramming systems 10, software 40 and methods 30 may be used to reprogram firmware in field devices 20, such as engine control systems, including standby power generators, and the like, and remote monitoring or sensing systems, and the like. Exemplary remote reprogramming systems 10, software 40 and methods 30 may be implemented using wired or wireless communication links 15 to communicate with the field devices 20.

FIG. 1 illustrates exemplary over-the-air (wireless) remote programming systems 10 and wired remote programming systems 10. The exemplary over-the-air and wired programming systems 10 are implemented in conjunction with a field device 20, which may comprise an engine control system 20 for a standby power generator 28 or engine 28, for example, or a remote monitoring or sensing system 20, for example.

The exemplary remote over-the-air programming systems 10 comprise a remotely located server 11, such as a web server 11, for example, which may be interfaced to a wireless communications link 15, such as a cellular telephone network 15 or space-based communications network 15, for example. In the exemplary remote wired programming systems 10, the remotely located (web) server 11 are interfaced to the field device 20 via a wired communications link 15. It is to be understood that a combination of wired and wireless links 15 may be used to implement communication between the remotely located (web) server 11 and the field device 20.

The server 11 is configured with compiled source code 12, such as an Intel hex file 12, for example, that comprises updated firmware for a processor 21 employed in the field device 20. The Intel hex file 12 comprises source code 12 corresponding to firmware that is configured to operate the field device 20, such as the engine control system 28 or standby power generator 28, or the remote monitoring or sensing system.

The field device 20, such as the engine control system 20, standby power generator 20, or remote monitoring or sensing system, comprises a processor 21 which is coupled to a non-volatile memory device 23, such as an electrically erasable programmable read only memory (EEPROM) 23. In the case of a wireless implementation, the processor 21 is also coupled to a radio 25 which is configured to communicate over the cellular telephone network 15. The processor 21 may be configured to communicate with the radio 25 via a first communication port (port A). A second port (Port B) may be used to communicate data between the server 11 and the engine control system 28, and in particular, data relating to firmware updates.

The processor 21 comprises a code space memory 22 that includes boot code space and operational code space. Typically, the first line of code in the operational code space of the code space memory 22 causes a jump to the boot code space, which is used to boot the processor 21 and start operation of the engine control system 28 or monitoring system. The EEPROM 23 is used to store a downloaded Intel hex file 12 prior to reprogramming of the processor 21. The processor 21 comprises control/sense inputs and outputs that are coupled to external sensors or to engine control components. The firmware that runs on the processor 21 is operative to monitor various inputs and output data related to the sensed inputs. The sensed data is transmitted by way of the radio 25 over the wireless communications link 15, or the wired link 15, to the server 11 for storage and/or display.

In operation, the processor 21, when initially turned on, runs the boot code and configures monitoring of the sensors connected thereto, for example. Data from the sensors are sampled at predetermined times, or on command, under control of the processor 21 and firmware, and are transmitted over the communications link 15 to the server 11 for storage and/or display. The sensed data is transmitted via port A during such normal operation of the processor 21.

In the event that the processor 21 is to be updated with new firmware, in one embodiment, a command is sent to the processor 21 from the server 11 over the communications link 15 commanding the processor 21 to get updated a source code file ("get file"). When the "get file" command is received by the processor 21, it transmits a "send file" command over the communications link 15 to the server 11. In response to receipt of the "send file" command, the server 11 sends the source code file 12 (Intel hex file 12) comprising the updated firmware for the processor 21. In another embodiment, the "get file" and "send file" commands are not used. Instead, the server 11 sends (pushes) the updated source code 12 (Intel hex file 12) to the processor 21.

The Intel hex file 12 is processed by the processor 21 and is loaded into the EEPROM 23. The final line of code in the Intel hex file 12 is an end of file (EOF) instruction. Once the EOF instruction is loaded into the EEPROM 23, the processor 21 sends a "finished" command over the communications link 15 to the server 11. Individual packets comprising the Intel hex file 12 are transferred with their own individual checksum values to verify the correctness of the packets, and a checksum value is computed on the total data transfer.

In particular, a checksum value, such as a cyclic redundancy check (CRC) value, for example, is determined from the data stored in the EEPROM 23, and this value is transmitted over the communication link 15 to the server 11. The checksum (CRC) value is compared to the checksum (CRC) value at the server 11 and if the values are the same, a reprogram command is sent from the server 11 over the communication link 15 to the processor 21. If the values are not the same, the new hex file 12 is retransmitted to the processor 21, stored in the EEPROM 23, and the checksum (CRC) values are compared until the correct file 12 is stored.

When the checksum (CRC) values are the same, the processor 21 loads the contents of the EEPROM 23 into the code space memory 22 and a command is issued to reboot the processor 21, thus completing the firmware update. Thus, upon receipt of the reprogram command, the boot code copies data from the EEPROM 23 into the code space memory 22 of the processor 21. After finishing the copy process, the application restarts, and the new firmware is installed.

The code checksum value, such as the CRC value, for example, provides positive confirmation that all of the code has been transferred from the server 11 to the EEPROM 23. It also uniquely identifies the code that is transferred and stored in the EEPROM 23. Once the code is stored in the EEPROM 23, it may be transferred to the code space memory 22 of the processor 21 manually (using the reprogram web command), or automatically, based upon correct checksum calculations.

The reprogram command may carry the known-to-be-correct checksum (CRC) value within its command data structure. In this case, the processor 21 in the field device 20 calculates the checksum of the firmware, and if the calculated value matches the communicated value, the processor 21 automatically reprograms itself. Otherwise, it ignores the command, since the code content is potentially corrupted as a result of transport over the communication link 15.

For the purposes of completeness, FIG. 2 is a flow diagram illustrating exemplary remote programming methods 30 and software 40. The exemplary methods 30 and software 40 may be implemented in conjunction with a processor 21 having a code space memory 22, which processor 21 may be coupled to a radio 25 and a nonvolatile memory device 23, such as an EEPROM 23. A remotely located (web) server 11 communicates with the processor 21 via a communications link 15, such as wired communications link 15, or a wireless, cellular telephone network 15 or space-based communication network 15, for example. The exemplary methods 30 and software 40 may be implemented as follows.

The processor 21 is turned on 31. Boot code is run 32 to configure the processor 21 and components coupled thereto. In the event that the processor 21 is to be updated with new firmware, in one embodiment, a command is sent 33 or transmitted 33 to the processor 21 from the server 11 over the communications link 15 commanding the processor 21 to retrieve a updated source code file 12 ("get file"). When the "get file" command is received by the processor 21, it transmits 34 a "send file" command to the server 11. In response, the server 11 sends 35 (transmits) the source code file 12 (updated firmware) for the processor 21. In another embodiment, the "get file" and "send file" commands are not used, and the server 11 sends (pushes) the updated source code 12 (Intel hex file 12) to the processor 21.

The Intel hex file 12 is processed 36 by the processor 21 and is loaded into the nonvolatile memory device (EEPROM) 23. When the end of file (EOF) instruction is loaded into the nonvolatile memory device (EEPROM) 23, the processor 21 sends 37 a "finished" command over the communication link 15 to the server 11. A checksum value, such as a cyclic redundancy check (CRC) value, for example, is computed 38 on the data stored in the nonvolatile memory device (EEPROM) 23, which may include checksum values for individual packets and for the entire data transfer. This value is transmitted 39 to the server 11 and is compared 41 to the checksum (CRC) value at the server 11. If the checksum (CRC) values are the same, a reprogram command is sent 42 from the server 11 to the processor 21. If the checksum (CRC) values are not the same, steps 34-41 are repeated, and the hex file 12 is retransmitted to the processor 21 and stored in the nonvolatile memory device (EEPROM) 23. The processor 21 is then automatically or manually commanded to load 43 the contents of the nonvolatile memory device (EEPROM) 23 into the code space memory 22 of the processor 21 and a command is issued to reboot 44 the processor 21, thus completing the firmware update.

In its broadest sense, the programming methods 30 and software 40 initiates a process that causes the updated firmware to be transferred from the server to the processor and stored in the nonvolatile memory device 23. When transfer is complete, a checksum is calculated for the transferred file, and if it matches a known checksum value, the updated firmware is transferred from the nonvolatile memory device 23 into code space memory 22 and the processor 21 is rebooted.

Thus, reprogramming systems, software and methods for remotely programming engines, engine control systems, power generators, and remote monitoring and data sensors, and the like, have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus comprising:

a communications link;

a processor comprising a nonvolatile code space memory and firmware that is loaded into the nonvolatile code space memory, which processor is coupled to a nonvolatile memory device and apparatus for communicating over the communications link;

a remotely located server configured to communicate with the processor over the communications link and that comprises a source code file comprising updated firmware for the processor; and software that:

if the processor is to be updated with new firmware, causes the server to send the source code file comprising the updated firmware to the processor;

causes the processor to load the source code file into the nonvolatile memory device, and when finished compute a checksum value;

compares the computed checksum value to a known checksum value for the source code file;

if the checksum values are the same, copies the contents of the nonvolatile memory device into the nonvolatile code space memory to reprogram the processor; and reboots the processor.

2. The apparatus recited in claim 1 wherein the software:

sends a command from the remotely located server to the processor commanding the processor to get the source code comprising the updated firmware file; and upon receipt of the command by the processor, causes the processor to transmits a send file command to the server;

whereafter, the server sends the source code file comprising the new firmware to the processor.

3. The recited in claim 1 wherein the communications link comprises a wired communications link.

4. The apparatus recited in claim 1 wherein the communications link comprises a wireless communications link, and wherein the apparatus for communicating over the communications link comprises a radio.

5. The apparatus recited in claim 4 wherein the wireless communications link comprises a cellular telephone network.

6. The apparatus recited in claim 4 wherein the wireless communications link comprises a space-based communication network.

7. The apparatus recited in claim 1 wherein the processor is coupled to an engine control system.

8. The apparatus recited in claim 1 wherein the processor is coupled to a standby power generator.

9. The apparatus recited in claim 1 wherein the processor comprises a plurality of communication ports, and wherein a first port is used for communicating data between the processor and the server, and the second port is used for firmware updates of a controller.

10. The apparatus recited in claim 1 wherein if the checksum values are not the same, the software causes the source code file to be retransmitted to the processor and stored in the nonvolatile memory device until the compared checksum values indicate that the correct file is stored.

11. A method for use with apparatus comprising a communications link, a processor comprising a nonvolatile code space memory and firmware that is loaded into the nonvolatile code space memory, which processor is coupled to a nonvolatile memory device and apparatus for communicating over the communications link, and a remotely located server configured to communicate with the processor over the communications link and that comprises a source code file comprising updated firmware for the processor, the method comprising:
   sending the source code file comprising updated firmware to the processor;
   causing the processor to copy the source code file into the nonvolatile memory device;
   when the source code file is copied into the nonvolatile memory device, computing a checksum value;
   comparing the computed checksum value with a known checksum value for the source code file;
   if the checksum values are the same, copying the contents of the nonvolatile memory device into the nonvolatile code space memory to reprogram the processor; and
   rebooting the processor.

12. The method recited in claim 11 further comprising:
   sending a command from the remotely located server to the processor commanding the processor to get the source code file comprising the updated firmware;
   upon receipt of the command by the processor, causing the processor to transmit a send file command to the remotely located server; and
   upon receipt of the send file command by the server, sending the source code file comprising the updated firmware to the processor.

13. The method recited in claim 11 further comprising:
   if the checksum values are not the same, retransmitting the source code file from the remotely located server to the processor; and
   storing the retransmitted source code file in the nonvolatile memory device until the compared checksum values indicate that the correct file is stored.

14. Software embodied on a non-transitory computer readable medium for updating firmware in a processor that communicates with a remotely located server over a communications link, the processor comprising a nonvolatile code space memory, and being coupled to a nonvolatile memory device and a radio for communicating over the communications link, the software comprising:
   a code segment that sends a source code file comprising updated firmware to the processor;
   a code segment that causes the processor to copy the source code file into the nonvolatile memory device;
   a code segment that computes a checksum value once the source code file is copied into the nonvolatile memory device;
   a code segment that compares the computed checksum value with a known checksum value for the source code file;
   a code segment that, if the checksum values are the same, copies the contents of the nonvolatile memory device into the nonvolatile code space memory to reprogram the processor; and
   a code segment that reboots the processor.

15. The software recited in claim 14 further comprising:
   a code segment that sends a command from the remotely located server to the processor commanding the processor to get the source code file comprising the updated firmware;
   a code segment that, upon receipt of the command by the processor, causes the processor to transmit a send file command to the server; and
   a code segment that, upon receipt of the send file command by the server, sends the source code file comprising the updated firmware to the processor.

16. The software recited in claim 14 further comprising:
   a code segment that, if the checksum values are not the same, retransmits the source code file from the remotely located server to the processor; and
   a code segment that stores the retransmitted source code file in the nonvolatile memory device until the compared checksum values indicate that the correct file is stored.

* * * * *